United States Patent Office 3,139,943
Patented July 7, 1964

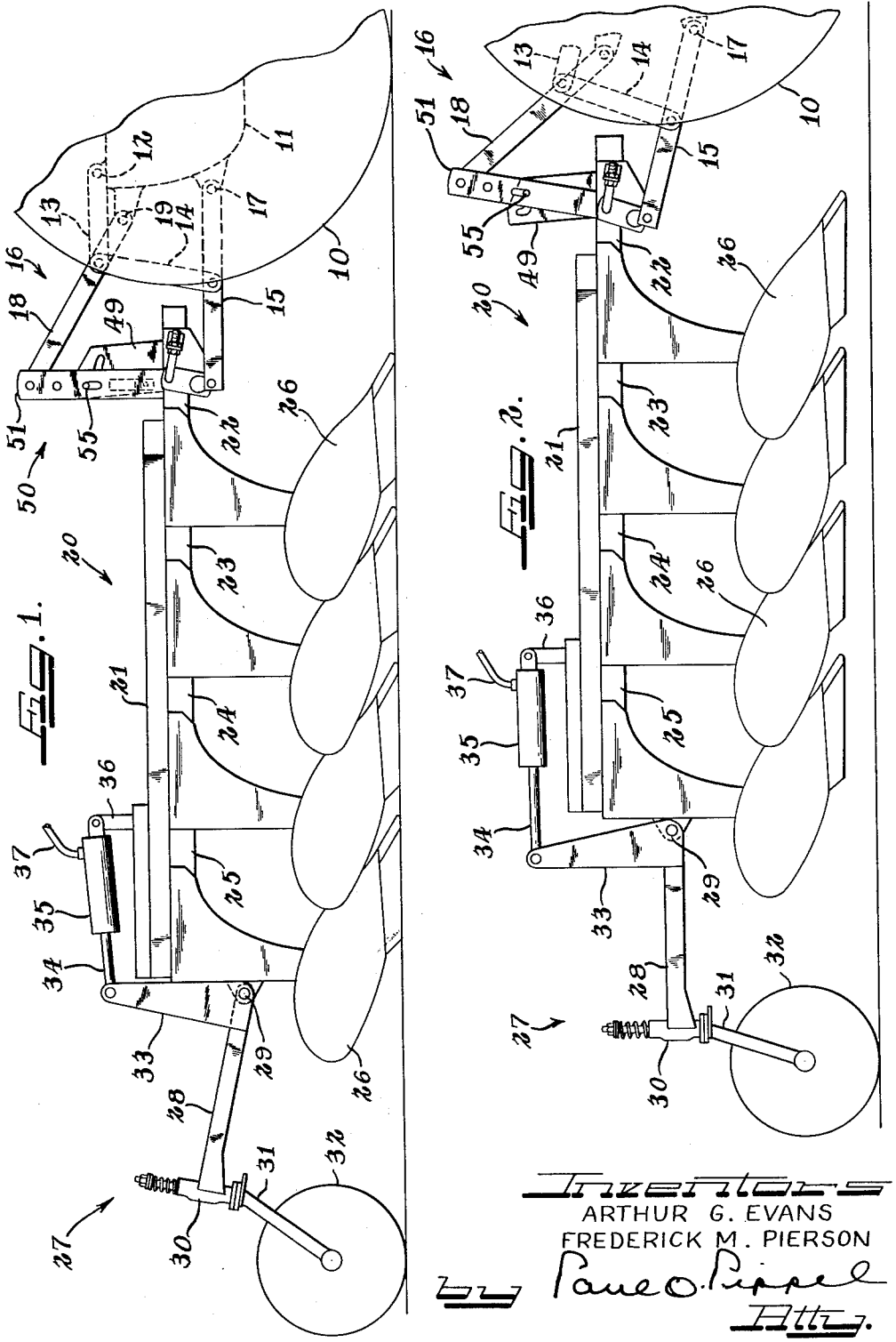

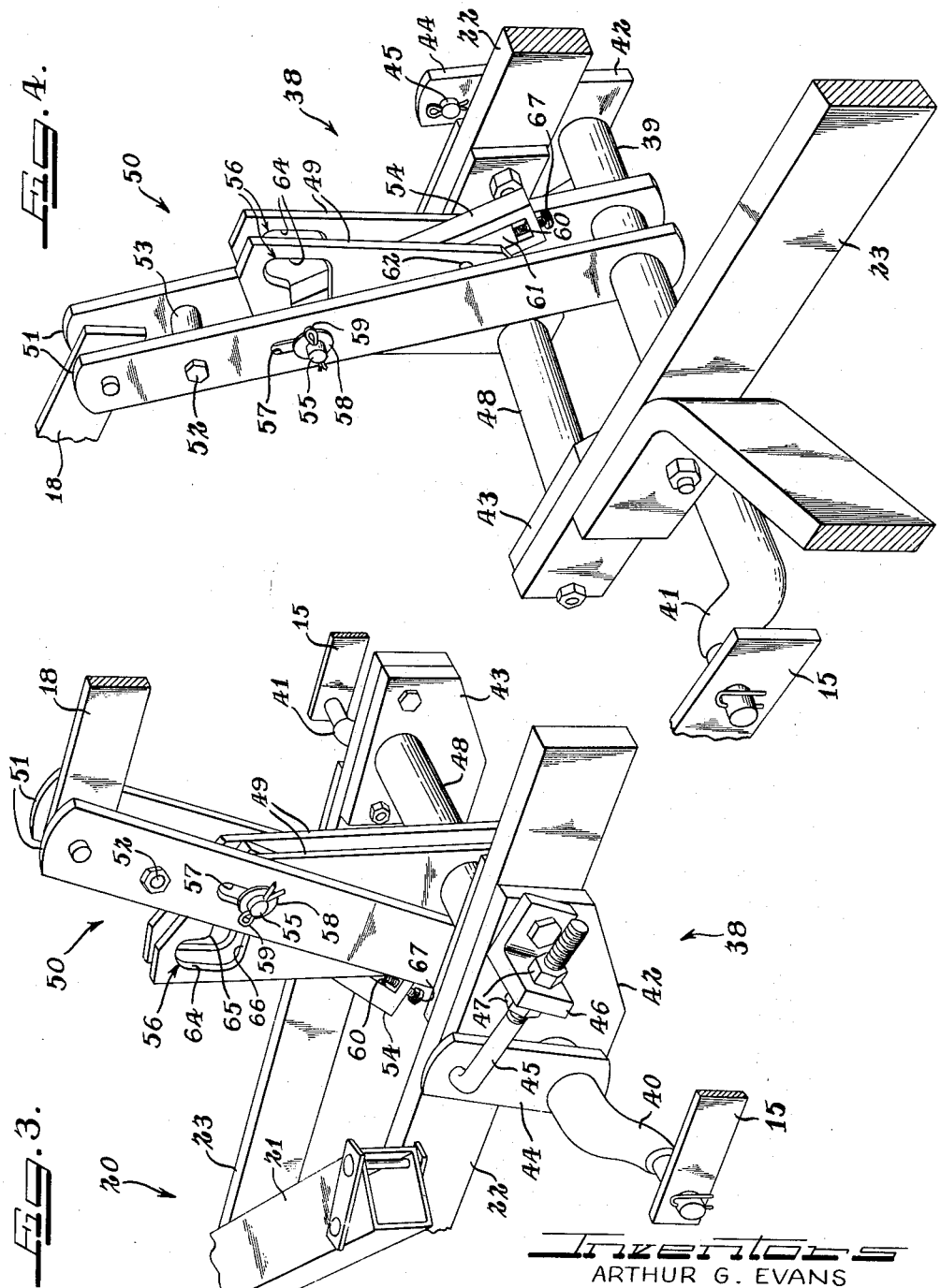

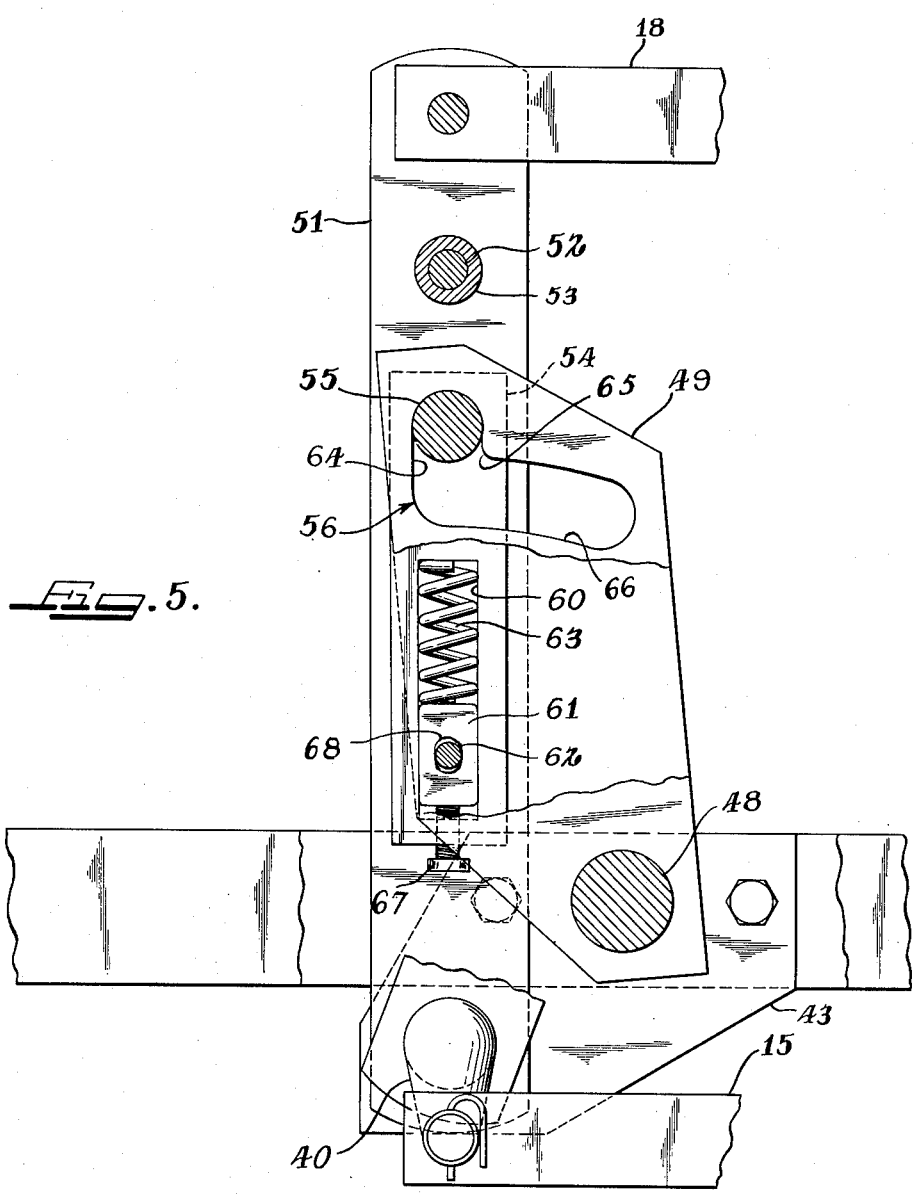

3,139,943
PLOW ATTACHMENT FOR TRACTOR
Arthur G. Evans, Wheaton, and Frederick M. Pierson, Naperville, Ill., assignors to International Harvester Company, Chicago, Ill., a corporation of New Jersey
Filed Jan. 25, 1962, Ser. No. 168,697
5 Claims. (Cl. 172—445)

This invention relates to agricultural implements and particularly to an implement of the type having its front end connected to a tractor to be raised and lowered with respect thereto. More specifically, the invention concerns an implement of semi-mounted type wherein the rear end is supported by ground engaging means such as a wheel.

In implement attaching hitches for tractors, such as the well known Three-Point Hitch, the hitch links are moved up and down between positions corresponding to operating and transport positions of an implement, and since the hitch links are pivoted on the tractor the vertical movement follows an arcuate path. This means that an implement secured to such a hitch also follows the same arc, and since the rear end of a multi-bottom plow is far removed from the axis of the arc it would reach an undesirably high elevation above the ground. In elongated implements such as multi-bottom plows it is desirable to support the rear end on a tail wheel to ease the load on the tractor and to facilitate transport, but with conventional tractor hitches lifting of the front end of the plow results in elevating the entire plow with its tail wheel above the ground. Therefore, an object of the present invention is the provision of an improved implement attachment for a tractor.

Another object of the invention is the provision of an implement attachment for a tractor wherein provision is made to compensate for the arc of travel of the implement hitch in moving from operating to transport position and to keep the implement substantially level with the ground in both operating and transport positions thereof.

Another object of the invention is the provision, in an implement such as a semi-mounted plow adapted for attachment to a tractor having a vertically swinging draft structure, of means forming a pivotal connection between the implement and the tractor hitch or draft structure to allow the implement to swing downwardly relative to the draft structure, the plow being locked to the draft structure by means releasable in response to the weight of the plow when it is raised to transport position.

Other objects and advantages of the invention will become clear from the following detailed description when read in conjunction with the accompanying drawings, wherein:

FIGURE 1 is a view in side elevation of the rear end of a tractor having connected thereto an implement and hitch or draft structure incorporating the features of this invention;

FIGURE 2 is a view similar to FIGURE 1 showing the transport position of the implement;

FIGURE 3 is an enlarged detail in perspective, partly in a section, showing the releasable locking means between the implement and the tractor draft structure;

FIGURE 4 is a perspective view similar to FIGURE 3 from the opposite side of the machine, and FIGURE 5 is an enlarged sectional detail showing some of the mechanism for releasably locking the implement against pivoting relative to the tractor or its hitch structure.

Referring to the drawings, the numeral 10 designates one of the rear drive wheels of a conventional tractor having a body 11 and a shaft 12 mounted thereon and adapted to be rocked in any well known manner, not shown, by power derived from the tractor. The shaft 12 forms part of a power operated lift means which also includes arms 13 affixed to the rockshaft 12 and extending rearwardly therefrom and connected by lift link 14 with the lower links 15 of a Three-Point Hitch or draft structure 16.

The laterally spaced lower draft links 15 are pivotally connected to the tractor for vertical swinging about pivots 17, and, forming part of the draft structure 16 is an upper link 18, triangularly arranged with respect to the lower link 15, and having its forward end pivotally connected at 19 to the tractor for vertical swinging in an arcuate path along with lower links 15. Vertical swinging of the draft structure 16 is accomplished by rocking shaft 12 and lift arms 13.

The hitch or draft structure 16 of the tractor has connected thereto an implement in the form of a longitudinally elongated four bottom moldboard plow of the semi-mounted type having a frame 20 including a diagonal beam 21 secured to laterally spaced longitudinally extending frame bars 22, 23, 24 and 25, this structure being indicated in diagrammatic drawings in FIGURES 1 and 2. The plow frame 20 supports a plurality of plow units 26.

A wheel unit 27 supports the rear end of the plow frame and comprises a bar 28, the forward end of which is pivotally connected to the plow frame on a transverse axis at 29, and the rear end of which is secured to a vertical bearing 30 rotatably receiving the upper end of a spindle 31, the lower end of which carries a wheel 32. A vertically extending arm 33 is affixed to the forward end of bar 28, and its upper end is pivotally connected to a piston rod 34 slidable in a hydraulic cylinder 35 anchored to a lug 36 mounted on the plow frame. Fluid under pressure is supplied to cylinder 35 through hose 37 in any suitable manner deriving power from the tractor. Admission of fluid to the cylinder 35 rocks the rear end supporting wheel unit 27 in a counterclockwise direction from the operating position of FIGURE 1 to the transport position of FIGURE 2.

The draft structure 16 of the tractor is connected to a plow hitch structure 38 shown particularly well in FIGURES 3, 4 and 5, which includes a transverse shaft 39 having oppositely angled crank arms 40 and 41 at the ends thereof to which the rear ends of lower draft links 15 of the tractor are pivotally connected. Shaft 39 is rotatably mounted in plates 42 and 43 affixed to the respective frame bars 22 and 23.

Shaft 39 is rockable about its axis to level the plow and this is accomplished by the provision of a lug 44 affixed to one end of shaft 39 and pivotally connected to one end of a threaded rod 45 slidably receivable in a suitable opening provided in an L-shaped bracket 46 affixed to plate 42 and adjustably held in a fixed position by nuts 47.

A brace 48, cylindrical in section, extends between and is affixed to frame members 22 and 23 of the plow, and mounted upon this brace and secured to it as by welding, is a pair of latch plates 49, forming part of an upright member or mast 50.

Mast 50 also includes a pair of upright members 51, pivotally mounted upon shaft 39 and laterally spaced to straddle latch member 49 and having their upper ends pivotally connected to the rear end of upper tractor hitch link 18. Members 51 are held in spaced relationship at their upper ends by a bolt 52 extending between members 51 and received in a spacer sleeve 53.

As will be observed from FIGURES 1 and 2, when moving from the operating to the transport position of the plow, the members 49 and 51 of mast 50 move relative to each other from the position of FIGURE 1 to that of FIGURE 2. This permits the plow frame to remain substantially level from front to rear in both operating and transport positions and also permits the upward tilting of the forward end of the plow in the initial raising operation to facilitate removal of the plow bottoms from the ground. With a rigid hitch structure the entire plow frame as well as the tail wheel would rise from the ground about the pivots of the tractor draft structure.

Slidably received between plates 49 is an elongated latch block 54 carrying a rotatable pivot pin 55 in its upper ends, the pin 55 extending laterally through L-shaped cam slots 56 formed in plates 49. The ends of pivot pin 55 also pass through vertically extending slots 57 formed in members 51, and it is held in place by washers 58 and cotters 59.

Block 54 has a rectangularly shaped slot 60 in which is slidably received a plug 61 mounted on a pin 62 which extends into suitable openings provided in the plates 49. Between the operating and transport positions of the implement as shown in FIGURES 1 and 2, the pin 62 is always covered by the members 51 so that it cannot be displaced.

Also received in the slot 60 is a spring 63 which engages the block 61 at one end and at its other end the upper edge of slot 60. As clearly seen in FIGURE 5 spring 63 urges the block 54 and roller 55 into a position with the roller 55 in the vertical part 64 of slot 56 where it provides a positive lock or latch to prevent relative pivoting of the plow and hitch in normal operation of the plow, and this corresponds to the operating position of the plow as shown in FIGURE 1.

In the operation of the plow of this invention the power operated rockshaft 12 on the tractor is actuated to swing the draft structure 16 upwardly about the pivots 17 and 19 on the tractor, when the operator reaches the end of a field and wishes to turn. The forward end of the plow tilts upwardly causing the plow bottoms to ride easily and quickly out of the soil. As the plow bottoms rise out of the groun dthe movement of the tractor draft structure 15 toward the position of FIGURE 2, and the weight of the plow cause the latching mechanism formed by the latch block 54, pin 55, plates 49 and member 51, to be released, the force of gravity acting upon the plow and the rolling friction of pin 55 causing compression of spring 63 while the pin 55 rolls over the cam face 65 in slot 56, the roller advancing to the end of the horizontal portion 66 of the slot. Pin 55 likewise is displaced to the bottom of slot 57 in members 51.

Upon actuation of the draft structure 16 to lift the front end of the plow, cylinder 35 is likewise actuated to raise and support the rear end of the plow in transport as shown in FIGURE 2. Upon return of the implement to its operating position pin 55 again becomes seated in the upper end of the vertical portion 64 of slot 56 to provide a positive lock and the parts are held in this position throughout the plowing operation, the direction and magnitude of forces acting on the plow in normal operation being insufficient to break the latch.

Adjustment in the tension of spring 63 is made by the provision of a set screw 67 received in a threaded opening provided in the lower end of block 54 and engageable with the lower end of plug 61, a slotted opening 68 being provided in plug 61 to receive pin 62 and accommodate the adjustment of the spring tension.

It is believed that the construction, function and operation of the implement attachment of this invention will be clearly understood from the foregoing description. It should likewise be understood that the invention has been described in its preferred embodiment and that modifications may be made therein without departing from the spirit of the invention or the scope of the appended claims.

What is claimed is:

1. In combination with a tractor having power operated lift means thereon, a draft structure pivotally mountel on the tractor and operatively connected to the lift means for vertical swinging of the draft structure in an arcuate path, an implement connected to the draft structure for vertical swinging therewith from an operating to a transport position, transverse hinge means in the connection between the implement and the draft structure accommodating limited downward pivoting of the implement relative thereto, means in said connection for positively locking the implement against pivoting relative to the draft structure during operation of the implement, said positive locking means being yieldable under the weight of the implement, after a predetermined lifting of the draft structure, to accommodate said pivoting of the implement.

2. In combination with a tractor having power operated lift means thereon, a draft structure pivotally mounted on the tractor and operatively connected to the lift means for vertical swinging of the draft structure in an arcuate path, an implement connected to the draft structure for vertical swinging therewith from an operating to a transport position, hinge means in the connection between the implement and the draft structure accommodating limited pivoting therebetween about a transverse axis, releasable locking means in said connection for positively holding the implement against pivoting relative to the draft structure, and yieldable means in said connection and operatively connected to said locking means for holding it in locked position during normal operation of the implement, said yieldable means being yieldable in response to the force of gravity acting on the implement upon raising it to its transport position to release said locking means.

3. The invention set forth in claim 2, wherein the connection between the draft structure and the implement includes vertically extending mast means mounted on the implement and comprising a rigid mast member and a movable mast member pivoted on the implement for movement relative to the rigid member, and said locking means is disposed between and interconnects said mast members at a location above the pivot of said movable member.

4. The invention set forth in claim 3, wherein said locking means includes a slot formed in one of said mast members and a pin is carried by the other of said mast members and receivable in said slot, and said yieldable means is associated with said members and engageable with said pin to hold it at one end of the slot.

5. The invention set forth in claim 4, wherein said slot has a vertical portion in which said pin is held by the yieldable means during operation of the implement and a horizontal portion in which the pin is received upon pivoting of the implement relative to the draft structure when the implement is raised to its transport position.

References Cited in the file of this patent

UNITED STATES PATENTS

| | | |
|---|---|---|
| 2,487,955 | Todd | Nov. 15, 1949 |
| 2,608,145 | Knapp | Aug. 26, 1952 |
| 2,704,020 | Wilson | Mar. 15, 1955 |
| 2,711,679 | Kuhary | June 28, 1955 |
| 2,712,278 | Wilson | July 5, 1955 |
| 2,712,279 | Altgelt | July 5, 1955 |
| 2,746,370 | Altgelt | May 22, 1956 |
| 2,796,818 | Tanke | June 25, 1957 |
| 2,822,739 | Altgelt | Feb. 11, 1958 |
| 2,855,835 | Altgelt | Oct. 14, 1958 |
| 3,035,645 | Wilson | May 22, 1962 |

FOREIGN PATENTS

| | | |
|---|---|---|
| 28,736 | Finland | Apr. 30, 1957 |
| 848,317 | Great Britain | Sept. 14, 1960 |

OTHER REFERENCES

German application 1,029,604, printed May 8, 1958.
German application 1,088,748, printed Sept. 8, 1960.